United States Patent
Lam et al.

(10) Patent No.: US 12,323,396 B1
(45) Date of Patent: Jun. 3, 2025

(54) NETWORK DATA DECODING AND ENCODING

(71) Applicant: Auradine, Inc., Santa Clara, CA (US)

(72) Inventors: Ho Yu Lam, Santa Clara, CA (US); Viswesh Ananthakrishnan, Palo Alto, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/035,283

(22) Filed: Jan. 23, 2025

Related U.S. Application Data

(60) Provisional application No. 63/624,034, filed on Jan. 23, 2024.

(51) Int. Cl.
*H04L 29/06* (2006.01)
*G06F 40/279* (2020.01)
*H04L 9/40* (2022.01)
*G06F 40/30* (2020.01)

(52) U.S. Cl.
CPC ........ *H04L 63/0281* (2013.01); *G06F 40/279* (2020.01); *G06F 40/30* (2020.01)

(58) Field of Classification Search
CPC ..... H04L 63/0281; G06F 40/279; G06F 40/30
See application file for complete search history.

(56) References Cited

U.S. PATENT DOCUMENTS

| | | |
|---|---|---|
| 2010/0011101 A1 | 1/2010 | Kay |
| 2019/0394117 A1* | 12/2019 | Sakya .................. H04L 43/028 |
| 2021/0271802 A1* | 9/2021 | Kramer .................... G06N 3/08 |
| 2021/0336928 A1* | 10/2021 | Sofer .................. G06F 21/6263 |
| 2022/0224725 A1 | 7/2022 | Chaubey |
| 2022/0368701 A1* | 11/2022 | Achleitner ............. H04L 67/14 |
| 2023/0208869 A1 | 6/2023 | Bisht et al. |
| 2025/0023894 A1* | 1/2025 | Sundar .................. H04L 43/026 |

OTHER PUBLICATIONS

Yamansavascilar, Baris, et al. "Application identification via network traffic classification." 2017 International Conference on Computing, Networking and Communications (ICNC). IEEE, 2017. (Year: 2017).*
International Search Report and Written Opinion in International Application No. PCT/US2025/012674, mailed on Apr. 10, 2025, 15 pages.

* cited by examiner

*Primary Examiner* — Ka Shan Choy
(74) *Attorney, Agent, or Firm* — Fish & Richardson P.C.

(57) ABSTRACT

A method includes: accessing, at a security proxy, a first transaction of a communications session between a client device and an application hosted by a server; clustering the first transaction with a plurality of other transactions for the application, based on a common data feature of the first transaction and the plurality of other transactions; providing structured data including indications of the clustering and the common data feature as input to a natural language processing (NLP) machine learning model; and based on one or more outputs of the NLP machine learning model, identifying the application, identifying a content type of a portion of data in the first transaction, and, based on the identified content type, generating a recipe for decoding network data corresponding to the application.

20 Claims, 7 Drawing Sheets

NETWORK DATA DECODING AND ENCODING

CROSS-REFERENCE TO RELATED APPLICATION

This application claims the benefit of the filing date of U.S. Provisional Application No. 63/624,034, filed on Jan. 23, 2024. The entirety of the foregoing application is incorporated herein by reference.

TECHNICAL FIELD

This disclosure relates generally to techniques and apparatuses for a network security proxy.

BACKGROUND

Communications between end users, such as client devices, and remote applications, such as applications hosted by network servers, carry security risks. The security risks include access control, leakage of users' intellectual property or sensitive data, and exposure to harmful content, among others.

BACKGROUND

Some aspects of this disclosure relate to a system that includes: at least one processor; and a non-transitory storage medium storing instructions that, when executed by the at least one processor, cause the at least one processor to perform operations. The operations include: accessing a first transaction of a communications session between a client device and an application hosted by a server, wherein the client device and the server are communicably coupled to the system through one or more network connections; clustering the first transaction with a plurality of other transactions for the application, based on a common data feature of the first transaction and the plurality of other transactions; providing structured data comprising indications of the clustering and the common data feature as input to a natural language processing (NLP) machine learning model; and based on one or more outputs of the NLP machine learning model, identifying the application, identifying a content type of a portion of data in the first transaction, and based on the identified content type, generating a recipe for decoding network data corresponding to the application.

This and other systems, methods, devices, and non-transitory storage media described herein can have one or more of at least the following characteristics.

In some implementations, the system includes an in-line proxy or gateway between the client device and the server.

In some implementations, the recipe indicates a procedure for extracting the portion of data from the network data corresponding to the application.

In some implementations, the content type includes a generative AI (GenAI) query or response.

In some implementations, the recipe indicates a signature based on which the network data corresponding to the application is identified as corresponding to the application.

In some implementations, the signature includes a key-value pair, a regex value, or a data structure.

In some implementations, the operations include: requesting additional transactions having the common data feature; and including the additional transactions, clustered with the first transaction, in the structured data.

In some implementations, the operations include: based on a common identifier in the first transaction and one or more second transactions of the plurality of other transactions, forming a time sequence of the first transaction and the one or more second transactions, wherein the structured data includes an indicator of the time sequence.

In some implementations, the common identifier includes a user identifier, a session identifier, or a file identifier.

In some implementations, the operations include: obtaining the network data corresponding to the application; identifying that the network data corresponds to the application using the recipe; in response to identifying that the network data corresponds to the application, decoding the network data using the recipe; and based on the decoding of the network data, determining one or more session features of the network data.

In some implementations, the one or more session features include at least one of a user identity, an authentication status, a session identifier, a file identifier, a domain accessed based on the network data, or a key protocol of the network data.

In some implementations, the recipe indicates a procedure for extracting the one or more session features from the network data.

In some implementations, the operations include executing a security enforcement procedure using the one or more session features.

In some implementations, the operations include determining a data type of a data element of the first transaction, and the structured data includes a label associating the data element with the data type.

In some implementations, clustering the first transaction with the plurality of other transactions and providing the structured data as input to the NLP machine learning model are performed based on a determination that the application cannot be identified.

In some implementations, the operations include: generating, based on the one or more outputs of the NLP machine learning model, a second recipe for encoding second network data corresponding to the application; encoding data using the second recipe; and injecting the encoded data into network traffic corresponding to the application.

The foregoing systems and/or operations performed thereby can be implemented as, or in conjunction with, methods, non-transitory storage media, devices, security proxies, gateways, and other suitable elements as described herein.

DETAILED DESCRIPTION

Figure 1:
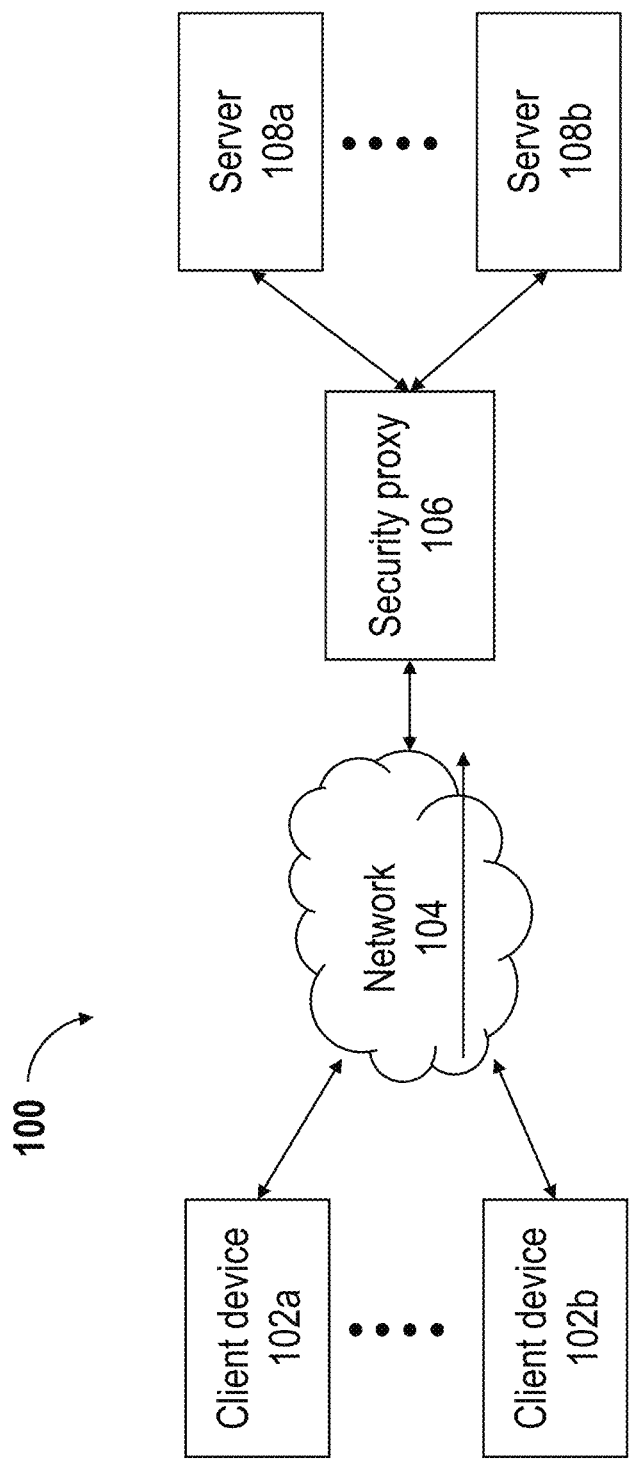
FIG. 1 is a diagram illustrating an example of a system including a security proxy.

Disclosed are techniques and apparatuses for a security proxy that is deployed between client devices and remote network servers that the client devices communicate with to use applications, artificial intelligence (AI) agents, and the like hosted by or in communication with the servers. The security proxy is hosted in the network and acts as a proxy in the network connections between the client devices and the network servers. The security proxy uses field-programmable gate arrays (FPGAs), application-specific integrated circuits (ASICs), and/or other hardware to inspect packets of network data, identify applications to which the network data corresponds, and generate recipes for decoding the network data to determine characteristics of the data, client devices, applications, users, etc. In some implementations, aspects of this processing can be performed using Generative AI (Gen AI) and/or other machine learning (ML) models.

In some implementations, the client devices are used by entities (e.g., employees) of a distributed enterprise. In some implementations, the client devices are used by individual users. In some implementations, the server applications are LLM-based applications, e.g., Gen AI applications, and the communications monitored by the security proxy include natural language data that is exchanged between the client devices and the Gen AI applications hosted by the network servers. In some implementations, the server applications include email, voice, video, image, and/or other textual data applications, and the communications monitored by the security gateway include data that are exchanged between the client devices and these various multimedia applications, e.g., email, voice, video, image, and/or other textual data. In some implementations, the client device executes an AI agent that performs communications monitored by the security gateway. In some implementations, the AI agent is hosted by a server. "Application," as used herein, includes AI agents, unless made clear otherwise by context.

Security for network communications may be improved by application-specific processing of data corresponding to the application. For example, security enforcement (e.g., role-based access control, prompt generation and acceleration, data anonymization, guarding against indirect prompt injections, or moderating Generative Ai (GenAI) model responses, among other enforcement operations) can be performed differently for different applications. Data/communications corresponding to different applications generally include different type(s) of data, organized differently. For example, communications representing a conversation between a user device and an AI agent or chatbot may include a series of queries and corresponding responses, whereas communications between a user device and a scheduling application hosted on a remote server may include data indicating dates, times, and/or locations of one or more events. Security enforcement and monitoring may be improved by effective, application-specific extraction of the data most relevant to each application (e.g., queries and responses, or times and locations), with that data organized (e.g., tagged or labeled) in a manner that permits efficient subsequent processing.

This process of identifying, extracting, and/or tagging particular data among a broader set of data can be referred to as decoding, and the decoding process can be performed according to a "recipe" (sometimes referred to as "rules" or "instructions") that can be specific to one or more applications and/or types of data, and/or can be generic to multiple applications and/or types of data.

However, traditional cybersecurity products may require an excessive amount of time (e.g., multiple weeks) and/or an excessive amount of manual labor to be configured to accurately decode data transmitted between a client device and a server. For example, when a new application is introduced, or when an existing application's data formatting/structure is altered, existing methods may rely on manual data review and annotation to generate new or updated recipes for decoding the data. Manual identification/decoding analysis of many applications may be prohibitively costly, as there exists a "long tail" of applications with relatively few users. Many of these applications may be rare but business-critical applications that should be included in packet-inspection analyses for effective security. In some cases, data of applications for which recipes are not available can be analyzed and processed in a more generic manner, e.g., analyzing lower-level artifacts without consideration of application-specific objects of interests. This type of generic processing may provide sub-optimal security results.

Moreover, effective security enforcement can be enhanced by effective correlation of data from multiple transactions. For example, single-sign-on (SSO) can allow a user to sign into multiple applications, where the multiple applications have different tokens, or different values for tokens, that are exchanged between a client device and server(s). It may be useful to be able to correlate all of these tokens together and to correlate together tokens corresponding to a single application, to obtain an accurate picture of a user's activities and improve subsequent enforcement in a user-specific and application-specific manner. However, it may be difficult to know which portions of SSO transactions are most relevant for identifying the corresponding application and user.

The use of large language models (LLM) provides another option for analysis of network data. However, LLM-based analysis may not be practical for many security purposes, e.g., real-time or near-real-time application identification and data decoding. For example, prohibitively high computational resources may be required to process entireties of monitored network data, in real-time or near-real-time, using an LLM. Also, even when real-time or near-real-time analysis is not required, general-purpose LLMs may not perform effectively and/or consistently at analyzing communications unless the communications have been significantly processed beforehand.

Some implementations according to this disclosure improve the technology of data monitoring (e.g., the technology of proxy-based security monitoring) by providing systems and methods for processing data of communication sessions in order to automatically infer the underlying application and/or application type (e.g., within seconds or minutes) and generate corresponding decoding logic, drastically reducing the time taken to defend against new and modified applications. The automated nature of the approaches described herein can reduce the time in which security can be applied to new and updated applications and reduce the cost of providing security. Further, the approaches described herein can be applied to obtain "lightweight," computationally-efficient recipes and analysis routines that can be feasibly applied to real-time and near-real-time monitoring.

FIG. 1 shows a system 100 that uses a security proxy (which may be a security gateway) as described throughout this disclosure. As shown, the system 100 includes one or more client devices 102a and 102b that are connected to one or more remote servers 108a and/or 108b, through a communications network 104. A security proxy 106 is deployed in the network and acts as an in-line deep packet inspection proxy for the connections between the client devices 102a-102b and the servers 108a-108b. In some implementations, the processes described herein as being performed by the security proxy 106 can be performed by a packet inspection apparatus that is not in-line, e.g., that taps or otherwise obtains network traffic without being in-line as shown in FIG. 1.

In some implementations, the client devices 102a-102b are associated with a distributed enterprise, e.g., are computers used by employees of an enterprise. The one or more remote servers 108a and/or 108b can host applications that are used by the enterprise users. In some implementations, these applications include GenAI applications, for example third party applications using a GenAI model such as ChatGPT, Google Gemini, etc. Additionally or alternatively, in some implementations, these applications include DIY enterprise applications, for example, based on a GenAI model such as Support CoPilot. In some implementations, the remote servers 108a and/or 108b host an AI agent that communicates with the client devices 102a-102b. In some implementations, an AI agent executes on the client devices 102a-102b and communicates with a corresponding application on the remote servers 108a and/or 108b.

The network 110 includes one or more wired and/or wireless connections. In some implementations, the network 110 includes the Internet.

Figure 2:
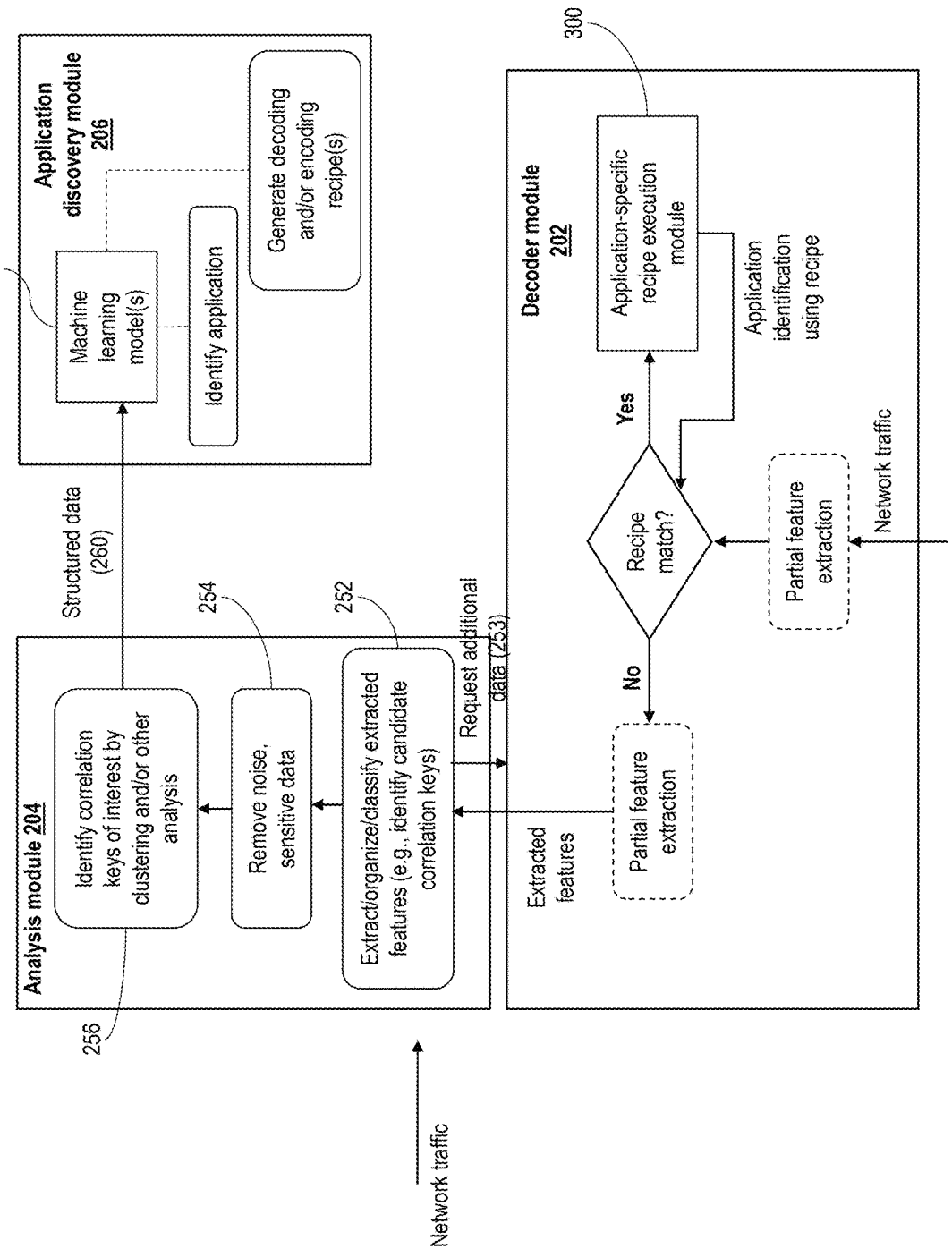
FIG. 2 is a diagram illustrating an example of a security proxy.

FIG. 2 illustrates an example of the security proxy 106. In this example, the security proxy 106 includes a decoder module 202, an analysis module 204, and an application discovery module 206. Each of the modules 202, 204, 206 can be implemented by hardware and/or software, e.g., by discrete and/or integrated specialized or non-specialized computing devices and/or by software instructions that, when executed, cause performance of the operations described with respect to the modules 202, 204, 206. Moreover, the configuration of the modules 202, 204, 206 is merely an example; in some implementations, the modules 202, 204, 206 can be combined with one another and/or split into multiple modules, and the corresponding operations (e.g., of process 400 and associated processes) can be performed by one or more modules.

The decoder module 202 performs deep packet inspection on network traffic (e.g., in the form of transactions) to extract as much detail as possible, based on the decoder module's 202 understanding of standard Internet protocols and content formats (http, json, xml etc.). Extraction decode logic (a "recipe" for a given application) can be continually upgradeable software content that runs on a well-defined underlying modular foundational decoder architecture. The foundational decoder provides the fundamental application protocol decoding capabilities that can be utilized in various layers and sequences such that it is capable of decoding the vast majority of application protocols. The decoder engine being modular also allows continuous expansion of its capability as new fundamental decoding capabilities are required in the future.

The decoder module 202 includes and/or has access to (e.g., in an external database) application-specific decoding recipes on how network traffic (e.g., transmitted transactions) corresponding to particular applications is to be processed. For example, the decoding recipes may indicate how decoding modules and decoding steps are to be configured or organized for data for a given application. Decoding includes performing deep packet inspection to, based on the use of protocols and formats in the network packets, extract data such as user, IP addresses, domain names, specific content portions, etc. which can then be used to better structure, organize, and/or analyze such information. For example, decoding can include identifying objects of interest, tagging the objects of interest by their type(s), identifying relevant metadata (e.g., user/role, intent of operation, application, etc.), flagging objects for any required processing by a next layer/stage such as unzipping, JSON parsing, base64 decoding, pdf decoding, JWT token decoding, URL decoding, etc., and/or tagging object with feature-specific meanings (such as tagging a code file/ snippet that a certain downstream processing layer should process). Such tagging could have overlaps, such as a tag (e.g., file embedded object or file header) on a particular offset within a binary file that a downstream file processor (e.g., an anti-virus) may process. The recipe can specify what the objects of interest in each transaction are, how the application corresponding to a transaction can be identified, how the objects of interest should be tagged or otherwise interpreted, how the objects of interested can be extracted, what metadata is relevant and/or should be extracted for analysis, what objects should be flagged for further processing and/or what type of processing should be performed, etc.

Figure 3:
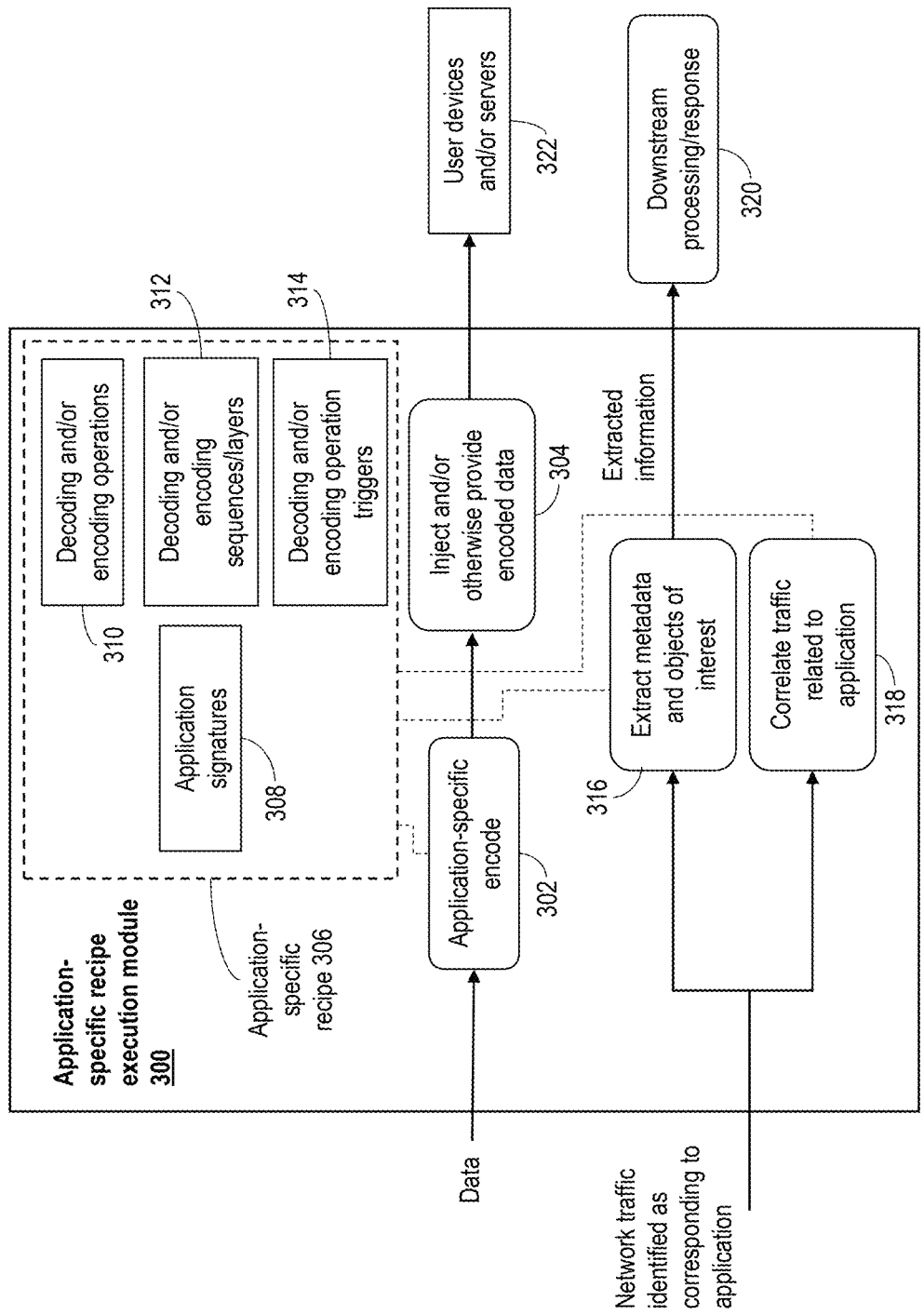
FIG. 3 is a diagram illustrating an example of recipe execution.

For example, as shown in FIGS. 2-3, an application-specific recipe execution module 300 can perform decoding based on the recipes, the recipes indicating, for example, in what sequences and layers the data is to be decoded, what decoding operations are to be performed, where relevant features are located in the data and how the features can be extracted (e.g., using decryption, feature mapping, decision trees, state machines, conditional logic, etc.), and/or under what conditions to trigger various actions. The recipes can instead or additionally be used to identify network traffic corresponding to the application, e.g., indicating what data elements of the network traffic are to be analyzed (and/or how they are to be analyzed) to identify that the network traffic corresponds to the application, and/or providing application signatures that can be used to identify applications corresponding to network traffic. In some implementations, the recipes indicate features by which traffic related to an application can be correlated with traffic being analyzed. In some implementations, the recipes indicate method (s) to be used by the analysis module 204 to obtain structured data from network data, e.g., in the case where network data from an updated application is being processed by the analysis module 204, such that a recipe for a prior version of the application exists.

For example, in some implementations, the recipe indicates one or more data portions (e.g., key-value pairs) in a transaction that identify the transaction as being associated with an application. In some implementations, the recipe indicates one or more data portions in the transaction that are common among multiple related transactions, e.g., a session identifier associated with a common chatbot conversation, or a user identifier associated with a common user. In some implementations, the recipe indicates one or more data portions that include content of interest, e.g., chatbot queries, chatbot responses, image data, file attachments. The recipe can indicate how this content of interest can be efficiently extracted, e.g., using a lightweight, real-time or near-real-time-compatible procedure. As discussed below in reference to FIG. 5, in some implementations, the recipe represents a solution to the technical problem of real-time or near-real-time content extraction in the context of large amounts of network traffic handled by a proxy or gateway.

Using the recipe for an application, the application-specific recipe execution module 300 can accurately track the application programming interface (API) endpoints used by the application to extract information (sometimes referred to as application session features) such as user identity, authentication status, domains accessed, key protocol characteristics, etc. For example, the recipe can indicate regex values of transactions, where the regex values are associated with user identity, authentication status, domains accessed, key protocol characteristics, API endpoints of the transactions, and/or the like. The recipe can instead or additionally identify key-value pairs in which the values include those and/or other types of data of interest. The extracted information can be provided for downstream processing, e.g., to perform one or more security operations in response to the extracted information. As discussed in further detail below, the recipes can be generated by the application discovery module 206.

As shown in FIG. 2, network traffic (e.g., data transmitted between a client device and a server) is received by the decoder module 202. In some implementations, the network traffic is at least partially processed to perform partial feature extraction, before determining whether a recipe exists for the network traffic. For example, this "partial feature extraction" can be generic feature extraction that need not be associated with a particular application or type of applications. The network traffic and/or features extracted during partial feature extraction are used to determine whether a recipe exists for the network traffic. If such a recipe exists, the network traffic is passed to the application-specific recipe execution module for decoding, processing, and analysis. If no such recipe exists (e.g., if the application corresponding to the network traffic cannot be identified and/or if no recipe exists for an identified application), the network traffic is passed to the analysis module 204. In some implementations, partial feature extraction (e.g., generic feature extraction) can be performed on the network traffic, and the resulting extracted features can be provided to the analysis module 204. Instead, or additionally, the network traffic itself can be provided to the analysis module 204. As an example, the partial feature extraction can include extraction of one or more generic features, such as a traffic header or a portion thereof for HTTP communications.

Based on the network traffic (e.g., a transaction) and/or features thereof, the decoder module 202 is configured to determine whether the transaction matches an existing recipe. For example, if the transaction is identifiable as network traffic for a previously-analyzed application for which a recipe has already been generated, the decoder module 202 can apply the recipe using the application-specific recipe execution module 300, as discussed with respect to FIGS. 3-5. For example, the decoder module 202 can search the transaction for particular regex strings associated with the application/recipe and/or for key-value pairs for which the key and/or value is associated with the application/recipe. These strings, keys/values, and/or other identifiers can be indicated by the recipes. If a match is found, processing can be performed by the application-specific recipe execution module 300. If no match is found, the analysis module 204 and the application discovery module 206 can be used to analyze the transaction and generate a recipe for use in the future.

Figure 5:
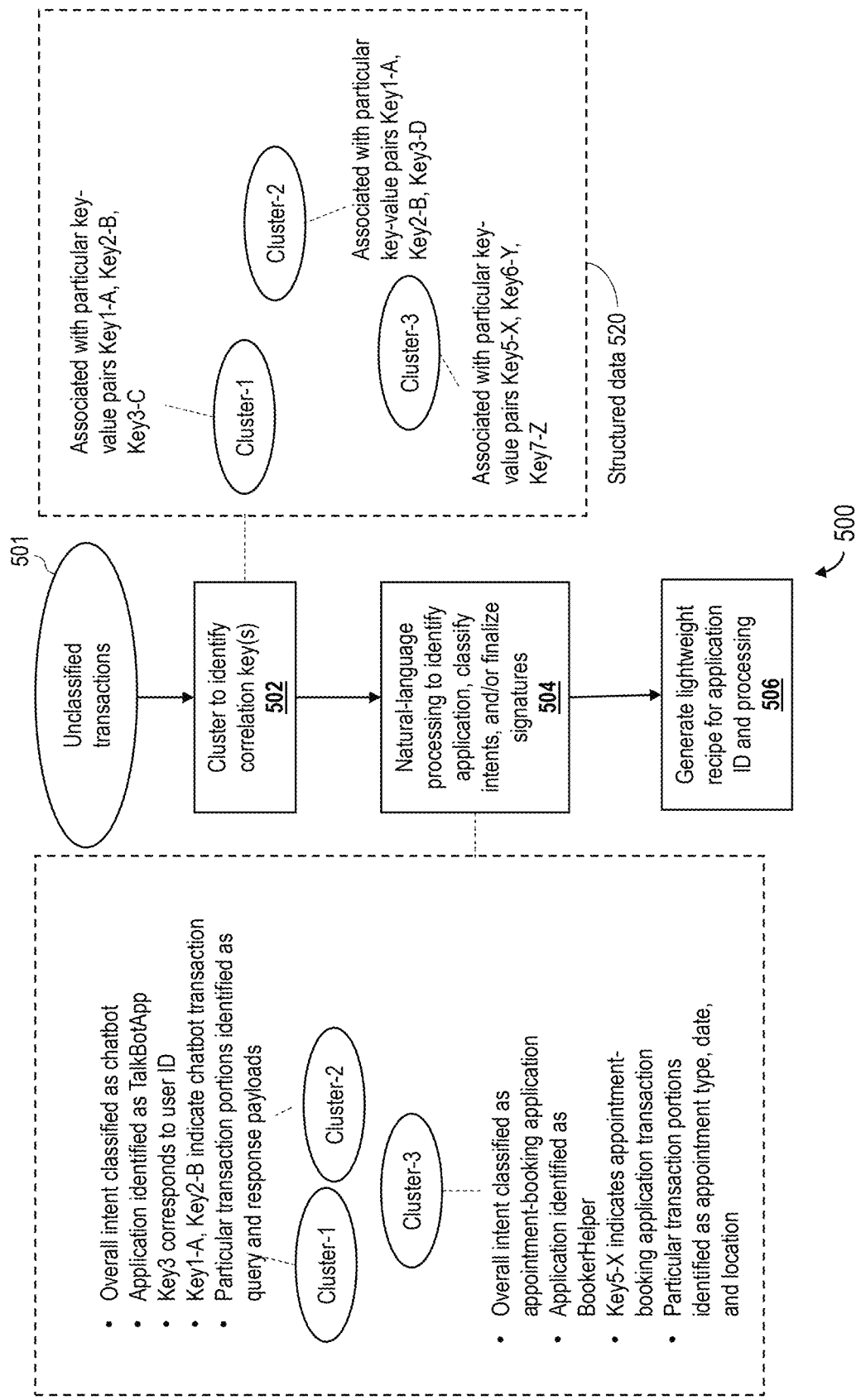
FIG. 5 is a diagram illustrating an example of transaction processing.

FIG. 5 illustrates an example of a process 500 that can be performed by the analysis module 204 and the application discovery module 206 to analyze network traffic (e.g., transactions) and thereby generate recipes for traffic processing.

The analysis module 204 is configured to process any extracted features and/or the network traffic itself. Features of the network traffic are structurally organized to make it easier to identify patterns around users, authentication schemes, authentication status, locations, various types of payloads, objects of interest in the network traffic, etc. As such, structured data 260 can be provided to the application discovery module 206 for subsequent analysis, analysis that may not be feasible if unstructured data were provided.

As shown in FIG. 2, the analysis module 204 can perform operations such as extracting, organizing, and/or classifying features of the data (252), where the data may include many individual transactions transmitted through or otherwise accessed by the proxy 106 or gateway, e.g., hundreds to millions of transactions. The analysis module 204 can extract, partition, and/or segment data of the transactions for subsequent processing. For example, the analysis module 204 can identify key-value pairs in the transactions, can extract header values from the transactions, can extract portions of accessed URLs or domain names, can segment content of the transactions into portions of content based on indicators in or structures of the transactions (e.g., JSON, XML, or form-urlencoded structures and/or associated indicators, labels, keys, and/or the like), and/or the like.

At least some of the extracted data can represent candidate correlation keys. At this stage in the processing, the most relevant portions of data for correlating transactions with one another (e.g., as being associated with the same application, user, session, etc.), referred to as "correlation keys," may not be known. The analysis module, at operation 252, can extract portions of transaction data, or segment the transaction data into portions, that are candidate correlation keys. The actual correlation keys can be identified from among the candidate correlation keys by subsequent processing (e.g., in operation 256, as discussed below).

Different transactions may have different data structures from one another based on the different applications, purposes, etc., with which the transactions are associated. For example, different transactions may include different type(s) of data, grouped/organized in different ways, from one another. In some cases, even transactions associated with different applications and/or purposes may have commonalities in their internal structure.

In some implementations, operation 252 includes labeling, classifying, or otherwise augmenting extracted portions of data, to facilitate later analysis. For example, extracted portions of data can be labeled with one or more of feature type (e.g., text, image, file type, key of a key-value pair, etc.), feature name (e.g., a label used in network data to refer to the extracted feature), or a reference to a location of the feature in a data structure (or data format) of the transaction from which the feature was extracted.

In some implementations, the extracted features include metadata of transactions in the network traffic. For example, the extracted features can include a location associated with the transaction (e.g., based on an IP address in the transaction or to/from which the transaction was sent), the IP address, a size of the transaction (e.g., number of bytes), or a data structure of the transaction.

The extracted features can instead or additionally include files, part of files, text snippets (e.g., an updated paragraph in an existing email draft), a system prompt of an AI assistant or agent, a user prompt/request to an AI assistant or agent, contexts/metadata such as filenames, text snippets of a webpage or file being viewed by the end user, text or other data provided by an AI assistant or agent at an endpoint to one or more of the servers 108*a*, 108*b*, links in a webpage, links in an application protocol for uploading a file, IDs in a link or a cookie or an http header, numerical or textual or alphanumeric identifiers, user identifiers, session identifiers, transaction types, protocols of transactions, key/value pairs, snippets of a document, etc. In some implementations, the extracted features include responses provided by an AI assistant (or other AI model) executing on the servers 108a, 10b, such as a generic disclaimer, text snippets, code, a generated image, a generated file, a modified user-supplied file, links to external sources, etc. In some implementations, the objects of interest can correspond to an email application API response, e.g., including a confirmation ID, a hash value, a response to a sync/update request, a file download, a user directory, a role-based organization chat, etc. Extracted features can include and/or can be referred to as "objects of interest," "content of interest," "parameters of interest," "data characteristics of interest," etc.

In some implementations, the analysis module 204 removes noise and/or sensitive data from the network traffic under analysis (254). Removing sensitive data can include removing the original sensitive content, and/or replacing the sensitive content with generic content in-kind (e.g., John Doe for male name, {US West Coast Large City Address} for a San Francisco address, {SSN1, SSN2} for identifiers, and/or using a one-way cryptographic hash of the original content with a metadata tag, etc.).

Based on the extracted features, the analysis module 204 identifies correlation keys and associates related transactions with one another using the correlation keys (256). This operation 256 can include feature selection to identify which one or more of the features are most relevant or useful for grouping related transactions with one another and distinguishing unrelated transactions from one another. These identified feature(s) can then be designated as correlation key(s).

For example, in some implementations, operation 256 includes clustering the transactions based on the extracted features, using one or more suitable methods. For example, the analysis module can apply hierarchical clustering or k-means clustering to cluster a set of hundreds to millions of transactions with the extracted features as variables of the clustering. In some implementations, the correlation keys are selected as features that are most useful for discriminating between clusters and/or determining that a transaction should be grouped into a given cluster, e.g., based on an analysis of variance (ANOVA) test or another suitable statistical test. Different clusters can have different and/or the same correlation keys.

As a result of operation 256, transactions are associated with one another for further analysis (e.g., where transactions grouped into a same cluster are associated with one another), and one or more correlation keys are identified that can be used to determine in which cluster a transaction should be grouped. Different clusters may correspond, for example, to different applications, different network sessions of an application, different users of an application, and/or different sessions and/or functions of given user of an application. A representation of the clustering and identified correlation keys is provided as structured data 260 to the application discovery module 206, as discussed in further detail below.

Operation 256 is not limited to the foregoing clustering methods. In some implementations, operation 256 instead or additionally includes an entropy analysis, a token-based analysis, or another suitable method. Further, although shown in a particular order in FIG. 2, the foregoing and/or other operations of the analysis module 204 can be performed in any suitable order.

An example of operation 256 is illustrated in process 500 of FIG. 5. As shown in FIG. 5, an initial set of unclassified transactions 501 is clustered to identify correlation keys (502). The result of the clustering is shown as structured data 520. The structured data 520 includes multiple clusters of transactions, here illustrated as Cluster-1, Cluster-2, and Cluster-3. The structured data 520 can include each transaction and an associated label indicating the cluster of the transaction. The structured data 520 can include indications of correlation key(s) based on which each cluster was identified, e.g., features that are common or similar for all transactions in each cluster, are most useful for distinguishing transactions in each cluster from transactions in other clusters, and/or are most useful for determining that each transaction in a cluster belongs in that cluster. In the case of FIG. 5, transactions are included in Cluster-1 based on those transactions having, in common, key-value pairs Key1-A, Key2-B, and Key3-C. Transactions are included in Cluster-2 based on those transactions having, in common, key-value pairs Key1-A, Key2-B, Key3-D. Transactions are included in Cluster-3 based on those transactions having, in common, key-value pairs Key5-X, Key6-Y, Key7-Z. Although, in this example, transactions have been grouped into clusters based on key-value pairs (e.g., the correlation keys are key-value pairs), it will be understood that other clustering bases are equally valid. For example, transactions can be included in Cluster-1 based on those transactions sharing a common URL portion; transactions can be included in Cluster-2 based on those transactions being associated with a common IP address of client device or server; and transactions can be included in Cluster-3 based on those transactions having a common data structure.

In some implementations, the analysis module 204 is configured to form grouped transactions into a time sequence, e.g., a time series of related transactions and/or a directed graph of related transactions. The time sequence can be based on times at which transactions were intercepted or obtained by the proxy 106 or gateway. The time sequence can represent, for example, an ordered sequence of queries and responses with a chatbot, an ordered sequence of emails from and to a user, an ordered sequence of web searches or application inputs, etc. In some implementations, the structured data 260 includes labels or other indicators of time sequences, e.g., each transaction in a time sequence can, in the structured data 260, be labeled with (i) an indicator of the time sequence and (ii) a time-ordering of the transaction in the time sequence and/or a time of transmission of the transaction. This can allow the machine learning model(s) 270 of the application discovery module 206 (discuss below) to better correlate and analyze transactions to identify applications and intents and to generate recipes.

In some implementations, the described processing by the analysis module 204, to obtain the structured data 260, directly improves the effectiveness of processing by the machine learning model(s) 270 of the application discovery module 206. As discussed below in relation to the application discovery module 206, the machine learning model(s) 270 can include natural language processing (NLP) models such as large language models (LLMs). For purposes of this disclosure, it has been identified that LLMs may not have high effectiveness for processing raw or generally-unstructured network traffic data, e.g., large sets of unorganized transactions. For example, even state-of-the art LLMs may not be able to identify intents and applications of unstructured transaction data. This represents a technical limitation of NLP models: although these models are effective at processing many types of data, NLP models have been found to perform less well specifically at processing network data to identify corresponding applications and intents and to generate recipes for processing future transactions.

However, it has been found that the use of structured data 260 as described herein can significantly improve performance by the machine learning model 270. For example, when the structured data 260 includes indicates groups of multiple clustered transactions and/or indicates correlation keys based on which the transactions were clustered, in some implementations, the machine learning model 270 performs more accurate natural language processing to identify content types, application identifiers, and/or the like.

As an example of processing network data to obtain structured data, the network data can include a set of HTTP transactions having payloads and HTTP headers including, e.g., cookies, file IDs, URL query key/value pairs, and/or the like. These HTTP transactions, as initially obtained in the unclassified transactions 501, may correspond to various different applications, users, sessions, etc. The decoder module 202 and/or the analysis module 204 (e.g., in operation 252) extracts features from the HTTP transactions. Among the extracted features are, for five concurrent/interleaved HTTP transactions, a common file ID and key/value pairs for file offset and chunk size. These five HTTP transactions were together used to upload one file. In operation 256 (e.g., clustering), the five transactions are grouped into the same cluster, and one or more of the file ID, the key/value pair for file offset, or the key/value pair for chunk size is categorized as a correlation key. The structured data 260 includes an indication of this clustering and of the identified correlation key(s). In some implementations, the structured data 260 includes labels of the features, e.g., the file ID may be labeled as a file ID and the key/value pairs for file offset and chunk such may be labeled as such. In some implementations, this labeling is carried out by the machine learning model(s) 270, e.g., using NLP. As discussed below, based on the grouping of the five HTTP transactions, the uploaded file can be reassembled and analyzed.

As another example, an online application can use Single-Sign-On (SSO) as its authentication method. The application protocol itself has few indications of a user's role or group. For role-based policies, the analysis module 204 can identify the SSO cookie or ID in an application transaction (as a correlation key), and thereby correlate the application transaction with an authentication transaction that exists in the network traffic prior to the application transaction, the authentication transaction including the same SSO cookie or ID. Additionally, or instead, the analysis module 204 can use a certain user ID or cookies from the application transaction to correlate the application transaction with a corresponding user directory. Because the authentication transaction (unlike the application transaction) includes user role and group data, content in the application transaction (or a chain of associated application transactions) can be associated with the user role and group and used for security enforcement. For example, a generated recipe for the application can define an automated procedure for extracting application content transmitted using specific user role(s), so that policy enforcement can be performed efficiently (e.g., in real-time or near-real-time) on a role-specific basis.

In some implementations, the analysis module 204 can request additional network traffic and/or extracted data from the decoder module 202 (253). This additional data can further aid in performing clustering, correlation key identification, and/or classification of application sessions, before providing well-formed clusters of application traffic to the next stage, the application discovery module 206. For example, the analysis module 204 can request additional transactions that satisfy one or more conditions related to transactions currently under analysis. For example, the additional data can include traffic (e.g., all traffic) within a certain time window from a same client as one or more transactions under analysis, traffic to/from a same server as the network data under analysis, and/or traffic to/from the same or similar domain/hosts as the network data under analysis. For example, if network traffic corresponding to mail.app1.com is under analysis, the requested additional data can include traffic data from accounts.app1.com and filestorage.app1.com. As another example, the analysis module 204 can query for transactions having one or more correlation keys in common with transactions under analysis. For example, five out of fifteen cookies of a set of transactions may have been identified as correlation keys (256). The analysis module 204 can then query those five cookie values against a database of known auth tokens, fileIDs, object IDs, userIDs, and/or general object IDs, to obtain potentially-related data that can be included in the structured data 260 to facilitate intent identification, session associations, metadata extraction/association, etc. The additional data (e.g., in analyzed form as structured data 260) can, in some implementations, be provided to the application discovery module 206 along with the transactions under analysis.

Referring again to FIGS. 2 and 5, machine learning model(s) 270 of the application discovery module 206 receive the structured data 260 as input. In some implementations, the machine learning model(s) 270 (referred to hereafter as machine learning model 270) includes one or more natural language processing (NLP) models (or natural language models). The machine learning model is trained to classify intents in the transactions of the structure data 260, determine applications corresponding to the transactions, and/or determine application signatures (504).

An identified intent can include, for example, an overall type of an application, such as chatbot, image editor, scheduling application, web browser, etc. In some implementations, an intent includes a content type, purpose, or other descriptor of a portion of data in a transaction. For example, the machine learning model 270 can identify that a particular portion of data in some transactions in the structured data 260 is a chatbot query, a chatbot response, an email subject-line, an email body, an image payload, a time and/or location corresponding to a scheduled event, code input by a user or suggested by a code completion AI, a particular type of identifier (e.g., a user ID, a file ID, a session ID, a transaction ID, and/or the like), etc. Some or all of the portions of data for which intents, or content type/purpose, are determined, may have been features extracted (at operation 502) and labeled or otherwise included in the structure data 260. The machine learning model 270 can output what the portions of data represent on a substantive and context-based level.

The machine learning model 270 can instead or additionally finalize signature(s) that, for a given transaction, indicate which application the transaction belongs to. For example, all transactions for a given application may include a certain encoded value, may have a certain data structure, may correspond to communication with a certain domain, and/or the like. The machine learning model 270 can be trained to, based on the structured data 260, output which of these and/or other parameters reliably correspond to the application. The determined signatures can then be used as application signatures for processing of future transactions, e.g., for use by the decoder module 202 to check whether an existing recipe is applicable to a transaction and, if so, apply the appropriate application-specific recipe.

Examples of outputs of the machine learning model 270 are shown in FIG. 5. Structured data 520 includes multiple transactions grouped into each of Cluster-1, Cluster-2, and Cluster-3. The machine learning model 270 determines, based on the structured data, that transactions in Cluster-1 and Cluster-2 are transactions for the same chatbot application. For example, the machine learning model 270 can determine that transactions for this chatbot application-identified as "TalkBotApp"—have a signature including that Key1 has value "A" and Key2 has value "B." E.g., these key-value pairs can be common to all or more transactions for the chatbot application. The machine learning model 270 can generate a recipe for processing transactions by the chatbot application, and the recipe can include checking whether these key-value pairs are included. When a new transaction is received by the security proxy 106, the decoder module 202 can check whether the key-value pairs are present and, if so, apply a recipe generated by the machine learning model 270, or based on outputs from the machine learning model 270, to decode the transaction.

In the example of FIG. 5, the machine learning model 270 also outputs that Key3 of Cluster-1 and Cluster-2 corresponds to a user ID. The machine learning model 270 can determine, and output, that Cluster-1 corresponds to a conversation between a first user and the chatbot, and that Cluster-2 corresponds to a conversation between a second user and the chatbot. The machine learning model 270 can determine, and output, that particular portions of the transactions of Cluster-1 and Cluster-2 are query and response payloads, e.g., including user input to the chatbot and replies by the chatbot. The machine learning model 270 can determine, and output, how the query and response payloads are indicated by, represented in, or otherwise identifiable in the transactions, permitting rapid identification of, and extraction of, these query and response payloads in the future.

These outputs of the machine learning model 270 can be used to generate lightweight, efficient recipes for identifying the applications to which transactions correspond, and processing the transactions in an application-specific manner (506). For example, in reference to the example of FIG. 5, when a future transaction is received, the decoder module 202 can check whether the transaction includes Key1-A and Key2-B key-value pairs. This check can be performed quickly and with few computational resources. If the transaction does include these key-value pairs, it is determined that the transaction corresponds to the chatbot application of Cluster-1 and Cluster-2, and corresponding application-specific processing (as indicated by the recipe) can be applied by the application-specific recipe execution module 300. For example, the application-specific recipe execution module 300 can rapidly and efficiently extract the query or response payload of the transaction, because the recipe (based on processing by the machine learning model 270) directly identifies which portion of the transaction is the query or response payload. As such, the transaction can be decoded in real-time or near-real-time in an application-specific manner.

In some implementations, execution of the recipe can include correlating the transaction with other chatbot transactions, corresponding to the same user, based on the transactions' Key3 values, and thereby forming a time-ordered sequence of extracted queries and corresponding extracted chatbot responses. Desired security operations can then be performed on the time-ordered sequence, e.g., checking for transmission of prohibited or confidential data. Although this example relates to chatbot transactions, it will be understood that the same or similar operations can be performed for series of associated transactions associated with other application types.

In the case of FIG. 5, based on the structured data 520, the machine learning model 270 identifies that transaction in Cluster-3 correspond to an appointment-booking application identified as "BookerHelper." Key5 having a value of X is determined as a signature of this appointment-booking application, such that transactions can be efficiently identified as corresponding to the appointment-booking application if they include the key-value pair Key5-X. The machine learning network can also identify particular transaction portions that correspond to appointment type, date, and location. A lightweight recipe can be generated to efficiently process future transactions by checking whether the transactions include Key5-X and, if so, extracting the appointment type, date, and location. Based on this extracted data, security operations can be performed to, for example, check whether the appointment type, date, and location conform to security requirements.

These and associated processes described herein represent a technical improvement to security proxies. While NLP-based methods, such as LLMs, are effective for analyzing network transactions, technical limitations of these methods (e.g., their high computational resource requirements, and/or their latency) may make them infeasible for real-time or near-real-time security operations. For example, it may be technically infeasible to perform real-time or near-real-time security monitoring using the machine learning model 270. However, the recipes described herein can consume fewer computational resources and/or operate with lower latency, making them suitable for monitoring by the security proxy 106. Therefore, according to some implementations of the present disclosure, a two-stage process includes first using the computationally-intensive machine learning model 270 to process a large number of network transactions, in order to derive less-computationally-intensive recipes for application identification and transaction decoding. These recipes are then applied by the security proxy 106 on newly-received transactions. Using the recipes, specific, target data of the newly-received transactions can be directly extracted, e.g., as opposed to having to perform machine-learning based NLP on newly-received transactions.

To perform the processing of the structured data 260 described above, the machine learning model 270 can have any of various architectures suitable for NLP. For example, the machine learning model 270 can include a large language model (LLM), a GenAI model, a neural network (e.g., a recurrent neural network (RNN)), a transformer model, and/or another suitable machine learning model type. In some implementations, the machine learning model 270 implements a statistical analysis. In some implementations, the machine learning model 270 implements tokenization. In some implementations, the machine learning model 270 generates the recipe (506). In some implementations, outputs of the machine learning model 270 (e.g., outputs of operation 504) are provided to one or more other machine learning models and/or applications configured to generate the recipe (506).

In some implementations, the machine learning model 270 is trained using controlled capture. For example, a user can intentionally trigger a certain operation, document the intent of such operation/other metadata, and provide, for training purposes, both captured traffic in the controlled environment and the metadata/intent. This training process is optional, and it will be understood that other suitable training processes are also within the scope of this disclosure. For example, the machine learning model 270 can be trained using a large corpus of data according to known LLM/GenAI training methods and known LLM/GenAI architectures.

FIG. 3 illustrates an example of the application-specific recipe execution module 300 and operations performed thereby. Operations shown in FIG. 3 can be performed by corresponding modules of the application-specific recipe execution module 300, using application-specific recipes. As shown in FIG. 3, an application specific recipe 306 can include one or more application signatures 308 based on which transactions corresponding to the application are to be identified. The signatures 308 can include, for example, the presence of a particular regex value, transmission to/from a particular IP address, association with a particular domain, the presence of a particular key-value pair, a particular data structure of the transaction, and/or the like. The application specific recipe 306 can include or define one or more decoding and/or encoding operations 310. As an example, an operation 310 can include extracting specified content from the transaction and, in some cases, performing specified processing on the extracted content. In some implementations, the application specific recipe 306 includes or defines specific sequences or layers 312 according to which decoding and/or encoding are to be performed. In some implementations, the application specific recipe 306 includes or defines decoding and/or encoding operation triggers 314 that define conditions for performing one or more operations 310. A trigger 314 can define that a second operation 310 should be performed in response to content extracted in a first operation 310 satisfying one or more conditions. For example, if an extracted key-value pair has a first value (indicating, for example, a first type of transaction of an application), a first operation 310 can be performed, and, if the key-value pair has a second value (e.g., associated with a second type of transaction), a second operation 310 can be performed. As another example, an operation 310 can include extracting text of a query to a chatbot. A trigger 314 can define that, if the extracted text indicates transmission of an image, another operation 310 should be performed to extract the image.

As defined by the recipe 306, the application-specific recipe execution module 300 can extract metadata of interest and/or content/objects of interest (316), e.g., rapidly and using relatively few computational resources, based on the previous, more intensive processing of structured data 260 by the machine learning model 270. This extraction can be performed using the operations 310, sequences/layer 312, and/or triggers 314. In some implementations, the recipe 306 defines traffic correlation operations 318 to be performed based on a transaction. The traffic correlation operations 318 can define parameters to be used to identify one or more second transactions, based on content extracted from a first transaction. For example, a recipe 306 can indicate that a user ID, session ID, or other identifier is to be extracted from a transaction (in an operation 310) and, further, that the application-specific recipe execution module 300 should search for other transactions sharing the same identifier. For example, the recipe 306 can define a time range over which transactions sharing the same identifier are to be collected. Outputs of extraction 316 and correlation 318 can be provided for downstream processing and possible security responses.

Moreover, generated recipes are not limited to decoding recipes. In some implementations, the application discovery module 206 is, additionally or alternatively, configured to determine encoding recipes. While decoding relates to extraction and analyzing application data, encoding can be used to encode/format data into a format corresponding to the application. For example, as shown in FIG. 3, in some implementations the application-specific recipe execution module 300 is configured to perform application-specific encode operations (302). For example, application-specific decoding recipes can be generated based on output by the machine learning model 270. Application-specific data, messages, media, etc., can be injected into network traffic (304) and provided to a client device 102a, 102b and/or a server 108a, 108b. The injected data can be correctly received and processed by the client device 102a, 102b and/or server 108a, 108b because it has been correctly encoded according to a generated recipe that is based on transaction analysis by the machine learning model 270.

The security proxy configurations described herein can improve the efficiency and efficacy of computer networks, for example, in the context of common contemporary application configurations. Contemporary applications may use many network transactions and application transactions to complete an operation or intent, and it can be useful to identify keys and IDs that the applications use for correlating all these transactions together in a cluster, or, given sufficient data and well-configured processing, in a graph/sequences of operations to obtain a comprehensive context and picture of the operations and intents that exist in the network.

As an example, using an online email system, when a user attaches a file to an email, the user has an option of uploading the file to a cloud system and including a link in the email. Determining the user intent and transaction of interest (the email) might include analyzing the email for context, and also scanning the attachment. Network traffic will include transactions with the email application and additional transactions with the cloud storage application. Each is a separate and valid transactions by itself, but together they complement one another, and it can be useful for security reasons to correlate them together for a number of interesting security features. However, it has been found that existing NLP models struggle at performing these tasks absent significant data structuring and, moreover, performing the foregoing analyses using full NLP-based approach (e.g., using an LLM) might introduce unacceptable latency into network traffic and security enforcement.

In accordance with the processes described above, the analysis module 204 can identify an ID, a generated link, and/or other object of interest in the email system transactions that links the transactions together (e.g., that results in the transactions being clustered together by the analysis module 204). The ID, generated link, or other object of interest is a correlation key. Structured data 260 can include an indication of the correlation key and of the clustering of the transactions sharing the correlation key. Using this structured data 260, the machine learning model 270 can effectively analyze the structured data 260 to (i) determine that the transactions correspond to the online email system, (ii) determine which portions of the transactions correspond to email subject, body, sender, recipient, attachment, etc., and (iii) build a recipe that allows the decoder module 202 to rapidly and efficiently identify future transactions that correspond to the online email system, extract one or more of the foregoing content types for security processing (316), and output a correlation of related transactions of the online email system for security processing (318).

As another example of recipe execution by the application-specific recipe execution module 300, multiple HTTP transactions that together upload a file can be identified as HTTP file upload transactions based on a data element of the transactions, or another signature, as identified by the machine learning model 270 and indicated in a corresponding recipe. Further, the recipe can indicate that values of specified key-value pairs (identified by the machine learning model 270 as corresponding to file ID and file offset) should be used to correlate together the upload HTTP transactions as corresponding to a common upload, e.g., from a larger set of HTTP transactions. The recipe can also indicate how data of the uploaded file can be extracted from the transactions. As such, this data can be extracted and the file can be reassembled to perform security checks on the file.

Continuing with the same example, the recipe can specify correlation of the upload HTTP transactions with an earlier "create HTTP" transaction based on a common file ID. The earlier transaction may have contained the original filename, file-type, etc., and those and/or other features of the transaction can be extracted and incorporated into security processing of the uploaded file.

In some implementations, transactions may be grouped into multiple clusters. For example, Key3 may be a user ID, and at least one transaction in Cluster-1 may also be grouped into another cluster in which transactions have, in common, the key-value pair Key3-C (e.g., and in which other transactions may lack Key1-A and/or Key2-B). As such, NLP in operation 504, and/or subsequent processing based on (e.g., indicated by, or included in) a generated recipe, can track the user corresponding to Key3-C across multiple applications, e.g., from using a chatbot to identify a service, to using a scheduling application to make an appointment with the service. For example, based on structured data 260 including data clustered based on the user ID key (or otherwise labeling the user ID and/or identifying the user ID as a correlation key), the machine learning model 270 can identify the user ID as a user ID. A recipe generated based on output from the machine learning model 270 can include operations 310 for efficiently extracting the user ID from a transaction, identifying other transactions sharing the user ID (e.g., transactions within a threshold time period from the transaction), and performing security operations jointly on the collection of transactions sharing the user ID.

As another example, a session key or tracking ID shared between two clusters of transactions, corresponding to two different applications, can allow the two different applications to be linked together as a family of applications for security processing and application identification.

When the transaction processing and recipe generation processes described herein are repeated over time across multiple end-users, the result can be an effective proprietary data set of recipes and signatures to automate the entire process of application discovery, including initial decoding of network traffic, automated development of precise signatures to identify and decode known applications, discovery of new applications, and ongoing signature maintenance to keep up with updates of existing applications. Recipes can be configured to operate with a user-centric view (e.g., what has this user visited or performed after transaction X), an application driven-view (e.g., what has this application interacted with, or caused additional API-calls/transaction to be launched, after its transaction number Y), and/or an event-driven view (e.g., what authentication events preceded the event at transaction number Z).

Downstream security operations (320) that can be performed based on information extracted from network traffic using application-specific decoding recipes include, but are not limited to: role-based access control; role-based and intent-based policy enforcement, where intents can include, e.g., Upload/Egress, Download/Egress, Update/Modify, Create, Delete, Share; filtering user inputs, queries, and prompts in transactions for intellectual property, sensitive data leakage, toxic language, personally identifiable information, and/or malicious queries; masking (anonymizing) sensitive data; guarding against indirect prompt injections; auditing; visibility into user queries and/or application responses; unmasking sensitive data; moderating GenAI model response; tracing data flow and content origination; and detecting and tracking intellectual property ownership, licenses, or infringements.

In some implementations, these and/or other security operations are performed by the security proxy 106 itself or by another system/device configured to perform the operations discussed herein, such as processes 400 and 500.

In some implementations, the machine learning model 270 used by the security proxy 106 is an AI model with a large number of parameters, which can range from a few million to hundreds of billions. These parameters use a large number (e.g., hundreds) of leading-edge processing units and large amounts of time (e.g., weeks) to train, and a large number of processing units for inference. In some implementations, the processing units that are used by the security proxy 106 are realized using customized, task-specific silicon hardware and corresponding software. The hardware can include custom processors that are implemented in FPGAs or ASICs, among other suitable processing units. In some implementations, these hardware can be used to replace expensive graphical processing units (GPUs) from third party vendors. In such implementations, the machine learning model is supported by engineered hardware acceleration solutions (e.g., FPGAs or ASICs) that provide a highly performant and economical solution to the challenge of inspecting Gen AI-bound application traffic and providing security enforcement. In some implementations, the machine learning model 270 is executed using general purpose processors and/or GPUs. Accordingly, the security proxy 106 can be configured for leading performance and high scalability, while consuming a limited amount of power.

Figure 4:
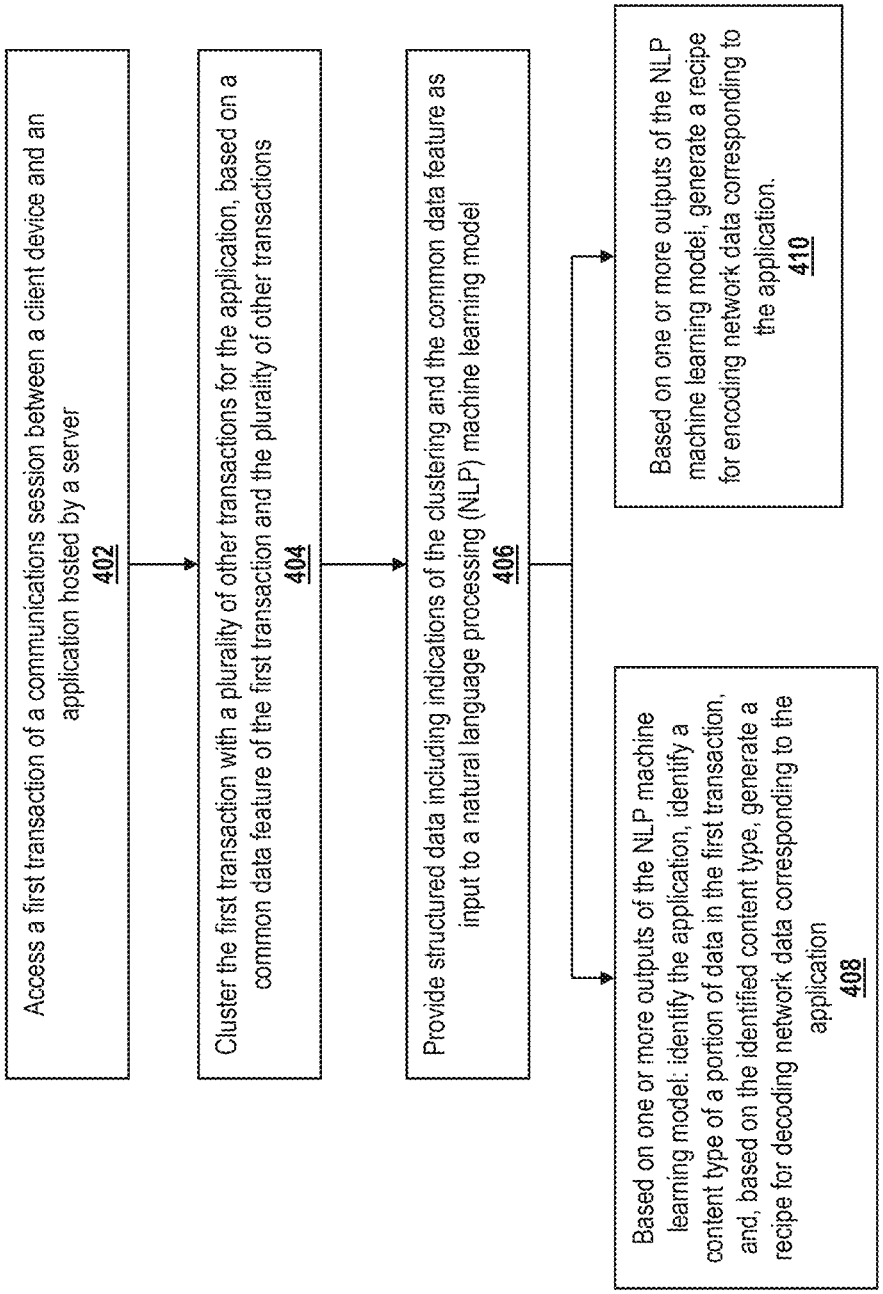
FIG. 4 is a diagram illustrating an example of a recipe generation process.

FIG. 4 illustrates an example of a process 400 for application identification and recipe generation. In some implementations, the process 400 can be performed at least partially by an in-line security proxy, e.g., by modules 202, 204, 206 of security proxy 106, as described above. It will be understood that the modules 202, 204, 206 need not be co-located and/or integrated into a common device. For example, in some implementations, network transactions are accessed by a networking component of the security proxy 106 (e.g., a proxy server, router, etc.), and NLP processing is performed by a computing system remote from the networking component, e.g., a cloud-based LLM/GenAI service. In some implementations, process 400 is performed by a computing system, e.g., computing systems 600 or 700 discussed below.

In the process 400, a first transaction of a communications session between a client device and an application hosted by a server is accessed (402). For example, the security proxy 106 can act as a proxy in the network and access data exchanged in communications sessions between one or more client devices 102a-102b and one or more applications hosted by the servers 108a-108b In some implementations, the security proxy 106 is a forward proxy and/or a reverse proxy. The security proxy 106 can be any suitable kind of network proxy/gateway, traffic monitoring, and/or traffic interception device, and is not limited to "full" proxies. The first transaction can be accessed, for example, by a firewall, a proxy, an endpoint, a sniffer, and/or the like.

"First" transaction, as used here, does not require that the transaction be temporally "first," but rather is merely a label for the specific transaction. The first transaction can be a temporally first, last, or intermediate transaction in a chain or tree of related transactions (e.g., from the point of view of the application). Subsequent clustering and correlation can therefore associate the first transaction with transactions accessed before and/or after the first transaction.

The process 400 includes clustering the first transaction with a plurality of other transactions for the application, based on a common data feature of the first transaction and the plurality of other transactions (404). The common data feature can be a correlation key as discussed above with respect to FIG. 2. For example, the common data feature can be a key-value pair, regex value, data structure or data format, metadata characteristic (e.g., domain, API endpoint, and/or the like), etc.

The process 400 includes providing structured data including indications of the clustering and the common data feature as input to a natural language processing (NLP) machine learning model (406). As discussed above, the structured data described herein can allow the NLP machine learning model to accurately perform inference, thereby resolving technical issues associated with NLP processing of network transactions. The structured data can include or indicate, for example, clustering results, correlated time sequences, classifications/labels of data extracted from network transactions, and/or the like.

The process 400 includes, based on one or more outputs of the NLP machine learning model: identifying the application, identifying a content type of a portion of data in the first transaction, and, based on the identified content type, generating a recipe for decoding network data corresponding to the application (408). For example, intent analysis can be performed to identify the type of content, and the recipe can indicate a procedure for extracting the type of content from future transactions. The recipe can be a lightweight, low-latency, efficient process for processing network data corresponding to the application, e.g., as opposed to the relatively computationally-intensive NLP processing used to derive the recipe.

In some implementations, the process 400 includes, based on the one or more outputs of the NLP machine learning model, generating a recipe for encoding network data corresponding to the application (410). Accordingly, in some implementations the decoder module 202 can be an encoder module or a decoder/encoder module. Encoding operations can include, for example, prompt generation and acceleration to reduce hallucinations and improve explainability of user queries of GenAI models.

The modules and processes described herein need not be proxy-integrated. For example, modules 202, 204, 206, and/or other modules, can be provided with data to perform process 400 and/or other processes described herein, without being integrated into or coupled to a proxy. For example, the process 400 can be performed in an "offline" configuration in which past, previously-stored data is analyzed. For instance, the process 400 can be applied to any structured payload, crafted payload, or snippets of payload. Packet capture can be used as the input to the decoder module as an off-band (not inline) analyzer, tester, or traffic generator (e.g., using an encoding recipe encoder part).

It is to be noted that although process steps, method steps, algorithms or the like may be described in a sequential order above, such processes, methods and algorithms may generally be configured to work in alternate orders, unless specifically stated to the contrary.

Figure 6:
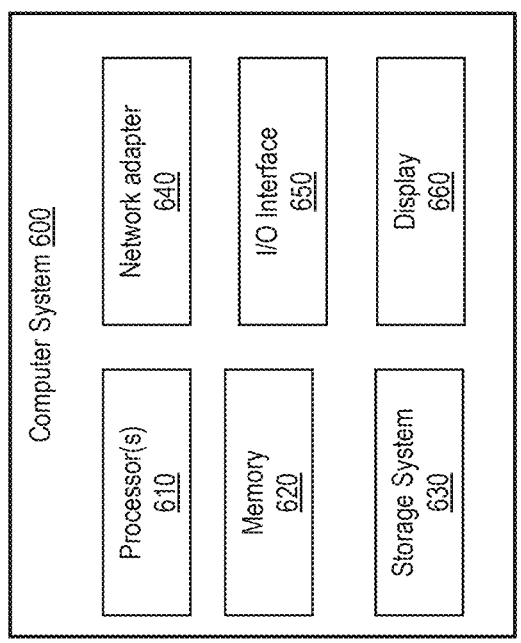
FIGS. 6 and 7 are diagrams illustrating examples of computer systems.

FIG. 6 is a block diagram illustrating a computer system 600. In some implementations, the computer system 600 of FIG. 6, or the computer system 700 of FIG. 7 described below, is configured to network data collection, transaction analysis, clustering, structured data generation, machine learning processing, recipe execution, and/or another process described herein, e.g., processes 400 and/or 500, and associated processes.

The computer system 600 may refer to any system including a general purpose or special purpose computing system. For example, the computer system 600 may include a personal computer, a server computer, a cloud computing system, a laptop computer, a home appliance, and the like. As shown in FIG. 6, the computer system 600 may include at least one processor 610, a memory 620, a storage system 630, a network adapter 640, an input/output (I/O) interface 650, and a display 660.

The at least one processor 610 may execute a program module including computer system executable instructions. The program module may include routines, programs, objects, components, logic, data structures, and the like, performing a specific task or implementing a specific abstract data type. The memory 620 may include a computer system readable, non-transitory medium in the form of a volatile memory such as a random access memory (RAM). The at least one processor 610 may access the memory 620 and execute instructions loaded in the memory 620. The storage system 630 may non-volatilely store information and may include at least one program product including a program module configured to perform inference and/or training by executing and/or otherwise using the deep learning networks described herein. A program may include, by way of non-limiting examples, an operating system, at least one application, other program modules, and program data.

The network adapter 640 may provide a connection to a local area network (LAN), a wide area network (WAN), and/or a public network (e.g., the Internet), etc. The I/O interface 650 may provide a communication channel with a peripheral device such as a keyboard, a pointing device, and an audio system. The display 660 may output various pieces of information so that the user may check the information.

In some implementations, the processes disclosed above are implemented as a computer program product. The computer program product may include a non-transitory computer-readable medium (or storage medium) including computer-readable program instructions for causing the at least one processor 610 to perform image processing and/or training of models. Computer readable instructions may be, but are not limited to, assembler instructions, instruction set architecture (ISA) instructions, machine instructions, machine dependent instructions, microcode, firmware instructions, state setup data, or source code or object code written in at least one programming language.

The computer-readable medium may be any type of medium capable of non-transitorily holding and storing instructions executed by the at least one processor 610 or any instruction executable device. The computer-readable medium may be an electronic storage device, a magnetic storage device, an optical storage device, an electromagnetic storage device, a semiconductor storage device, or any combination thereof, but is not limited thereto. For example, the computer readable medium may be a portable computer diskette, a hard disk, a random access memory (RAM), a read-only memory (ROM), an electrically erasable read only memory (EEPROM), a flash memory, a static random access memory (SRAM), a compact disc (CD), a digital versatile disc (DVD), a memory stick, a floppy disk, a mechanically encoded device such as a punch card, or any combination thereof.

Figure 7:
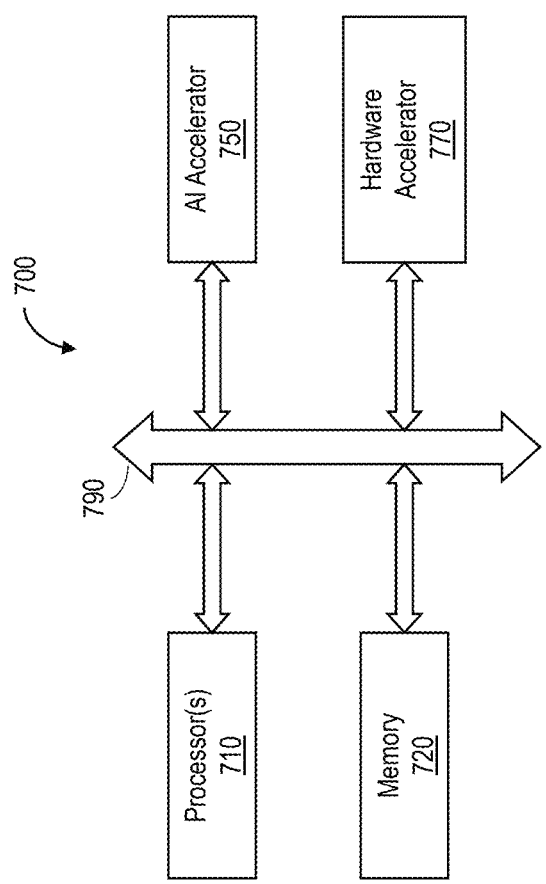

FIG. 7 illustrates another example of a computer system 700. In some implementations, processes described herein (e.g., those referenced in connection to FIG. 6) may be executed in or by the system 700.

Referring to FIG. 7, the system 700 may include at least one processor 710, a memory 730, an artificial intelligence (AI) accelerator 750, and a hardware (HW) accelerator 770, and the at least one processor 710, the memory 730, the AI accelerator 750, and the HW accelerator 770 may communicate with each other through a bus 790. In some implementations, the at least one processor 710, the memory 730, the AI accelerator 750, and the HW accelerator 770 are included in one semiconductor chip. Furthermore, in some implementations, at least two of the at least one processor 710, the memory 730, the AI accelerator 750, and the HW accelerator 770 are included in two or more semiconductor chips mounted on a board, respectively.

The at least one processor 710 may execute instructions. For example, the at least one processor 710 may execute an operating system by executing instructions stored in the memory 730, or may execute applications executed on the operating system. In some implementations, at least one processor 710 instructs the AI accelerator 750 and/or the HW accelerator 770 to perform a task by executing instructions, and may obtain a result of performing the task from the AI accelerator 750 and/or the HW accelerator 770. In some implementations, the at least one processor 710 is an application specific instruction set processor (ASIP) customized for a specific purpose, and may also support a dedicated instruction set.

The memory 730 may have an arbitrary structure for storing data. For example, the memory 730 may include a volatile memory device such as a dynamic random access memory (DRAM) or a static random access memory (SRAM), or a non-volatile memory device such as a flash memory or a resistive random access memory (RRAM). The at least one processor 710, the AI accelerator 750, and the HW accelerator 770 may store data in the memory 730 or read data from the memory 730 through the bus 790.

The AI accelerator 750 may refer to hardware designed for AI applications. In some implementations, the AI accelerator 750 includes a neural processing unit (NPU) for implementing a neuromorphic structure, may generate output data by processing input data provided from the at least one processor 710 and/or the HW accelerator 770, and may provide the output data to the at least one processor 710 and/or the HW accelerator 770. In some implementations, the AI accelerator 750 is programmable and may be programmed by the at least one processor 710 and/or the HW accelerator 770.

The HW accelerator 770 may refer to hardware designed to perform a specific task at high speed. For example, the HW accelerator 770 may be designed to perform data transformation such as demodulation, modulation, encoding, and decoding at high speed. The HW accelerator 770 may be programmable and may be programmed by the at least one processor 710 and/or the HW accelerator 770.

In some implementations, the AI accelerator 750 may execute the NLP machine learning models described herein.

Some implementations according to this disclosure include the following Examples.

Example 1: A system including: at least one processor; and a non-transitory storage medium storing instructions that, when executed by the at least one processor, cause the at least one processor to perform operations including: accessing a first transaction of a communications session between a client device and an application hosted by a server, wherein the client device and the server are communicably coupled to the system through one or more network connections; clustering the first transaction with a plurality of other transactions for the application, based on a common data feature of the first transaction and the plurality of other transactions; providing structured data including indications of the clustering and the common data feature as input to a natural language processing (NLP) machine learning model; and, based on one or more outputs of the NLP machine learning model, identifying the application, identifying a content type of a portion of data in the first transaction, and based on the identified content type, generating a recipe for decoding network data corresponding to the application.

Example 2: The system of Example 1, wherein the system includes an in-line proxy or gateway between the client device and the server.

Example 3: The system of Example 1 or 2, wherein the recipe indicates a procedure for extracting the portion of data from the network data corresponding to the application.

Example 4: The system of any of the foregoing Examples, wherein the content type includes a generative AI (GenAI) query or response.

Example 5: The system of any of the foregoing Examples, wherein the recipe indicates a signature based on which the network data corresponding to the application is identified as corresponding to the application.

Example 6: The system of any of the foregoing Examples, wherein the signature includes a key-value pair, a regex value, or a data structure.

Example 7: The system of any of the foregoing Examples, wherein the operations include: requesting additional transactions having the common data feature; and including the additional transactions, clustered with the first transaction, in the structured data.

Example 8: The system of any of the foregoing Examples, wherein the operations include: based on a common identifier in the first transaction and one or more second transactions of the plurality of other transactions, forming a time sequence of the first transaction and the one or more second transactions, wherein the structured data includes an indicator of the time sequence.

Example 9: The system of any of the foregoing Examples, wherein the common identifier includes a user identifier, a session identifier, or a file identifier.

Example 10: The system of any of the foregoing Examples, wherein the operations include: obtaining the network data corresponding to the application; identifying that the network data corresponds to the application using the recipe; in response to identifying that the network data corresponds to the application, decoding the network data using the recipe; and based on the decoding of the network data, determining one or more session features of the network data.

Example 11: The system of Example 10, wherein the one or more session features include at least one of a user identity, an authentication status, a session identifier, a file identifier, a domain accessed based on the network data, or a key protocol of the network data.

Example 12: The system of Example 10 or 11, wherein the recipe indicates a procedure for extracting the one or more session features from the network data.

Example 13: The system of any of the foregoing Examples, wherein the operations include executing a security enforcement procedure using the one or more session features.

Example 14: The system of any of the foregoing Examples, wherein the operations include determining a data type of a data element of the first transaction, and wherein the structured data includes a label associating the data element with the data type.

Example 15: The system of any of the foregoing Examples, wherein clustering the first transaction with the plurality of other transactions and providing the structured data as input to the NLP machine learning model are performed based on a determination that the application cannot be identified.

Example 16: The system of any of the foregoing Examples, wherein the operations include: generating, based on the one or more outputs of the NLP machine learning model, a second recipe for encoding second network data corresponding to the application; encoding data using the second recipe; and injecting the encoded data into network traffic corresponding to the application.

Example 17: The operations of any of Examples 1-16.

Example 18: One or more non-transitory storage media storing instructions that, when executed by one or more processors, cause the processors to perform the operations of any of Examples 1-16.

The processes and logic flows described in this document can be performed by one or more programmable processors executing one or more computer programs to perform the functions described herein. The processes and logic flows can also be performed by, and apparatus can also be implemented as special purpose logic circuitry, for example, a Field Programmable Gate Array (FPGA) or an application specific integrated circuit (ASIC).

The processes and logic flows described in this document can be performed by one or more programmable processors executing one or more computer programs to perform the functions described herein. The processes and logic flows can also be performed by, and apparatus can also be implemented as special purpose logic circuitry, for example, a Field Programmable Gate Array (FPGA) or an application specific integrated circuit (ASIC).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system comprising:
   at least one processor; and
   a non-transitory storage medium storing instructions that, when executed by the at least one processor, cause the at least one processor to perform operations comprising:
   accessing a first transaction of a communications session between a client device and an application hosted by a server, wherein the client device and the server are communicably coupled to the system through one or more network connections;
   clustering the first transaction with a plurality of other transactions for the application, based on a common data feature of the first transaction and the plurality of other transactions;
   providing structured data comprising indications of the clustering and the common data feature as input to a natural language processing (NLP) machine learning model; and
   based on one or more outputs of the NLP machine learning model,
   identifying the application,
   identifying a content type of a portion of data in the first transaction, and
   based on the identified content type, generating a recipe;
   wherein the recipe is configured to decode network data corresponding to the application.

2. The system of claim 1, wherein the system comprises an in-line proxy or gateway between the client device and the server.

3. The system of claim 1, wherein the recipe indicates a procedure for extracting the portion of data from the network data corresponding to the application.

4. The system of claim 1, wherein the content type comprises a generative AI (GenAI) query or response.

5. The system of claim 1, wherein the recipe indicates a signature based on which the network data corresponding to the application is identified as corresponding to the application.

6. The system of claim 5, wherein the signature comprises a key-value pair, a regex value, or a data structure.

7. The system of claim 1, wherein the operations comprise:
   requesting additional transactions having the common data feature; and
   including the additional transactions, clustered with the first transaction, in the structured data.

8. The system of claim 1, wherein the operations comprise:
   based on a common identifier in the first transaction and one or more second transactions of the plurality of other transactions, forming a time sequence of the first transaction and the one or more second transactions,
   wherein the structured data comprises an indicator of the time sequence.

9. The system of claim 8, wherein the common identifier includes a user identifier, a session identifier, or a file identifier.

10. The system of claim 1, wherein the operations comprise:
    obtaining the network data corresponding to the application;
    identifying that the network data corresponds to the application using the recipe;
    in response to identifying that the network data corresponds to the application, decoding the network data using the recipe; and
    based on the decoding of the network data, determining one or more session features of the network data.

11. The system of claim 10, wherein the one or more session features comprise at least one of a user identity, an authentication status, a session identifier, a file identifier, a domain accessed based on the network data, or a key protocol of the network data.

12. The system of claim 10, wherein the recipe indicates a procedure for extracting the one or more session features from the network data.

13. The system of claim 10, wherein the operations comprise executing a security enforcement procedure using the one or more session features.

14. The system of claim 1, wherein the operations comprise determining a data type of a data element of the first transaction, and
    wherein the structured data includes a label associating the data element with the data type.

15. The system of claim 1, wherein clustering the first transaction with the plurality of other transactions and providing the structured data as input to the NLP machine learning model are performed based on a determination that the application cannot be identified.

16. The system of claim 1, wherein the operations comprise:
    generating, based on the one or more outputs of the NLP machine learning model, a second recipe for encoding second network data corresponding to the application;
    encoding data using the second recipe; and
    injecting the encoded data into network traffic corresponding to the application.

17. A method comprising:
    accessing, at a security proxy, a first transaction of a communications session between a client device and an application hosted by a server, wherein the client device and the server are communicably coupled to the security proxy through one or more network connections;
    clustering the first transaction with a plurality of other transactions for the application, based on a common data feature of the first transaction and the plurality of other transactions;
    providing structured data comprising indications of the clustering and the common data feature as input to a natural language processing (NLP) machine learning model; and
    based on one or more outputs of the NLP machine learning model,
      identifying the application,
      identifying a content type of a portion of data in the first transaction, and
      based on the identified content type, generating a recipe;
    wherein the recipe is configured to decode network data corresponding to the application.

18. The method of claim 17, wherein the recipe indicates a procedure for extracting the portion of data from the network data corresponding to the application.

19. The method of claim 17, wherein the recipe indicates a signature based on which the network data corresponding to the application is identified as corresponding to the application.

20. The method of claim 17, comprising:
    based on a common identifier in the first transaction and one or more second transactions of the plurality of other transactions, forming a time sequence of the first transaction and the one or more second transactions,
    wherein the structured data comprises an indicator of the time sequence.

* * * * *